(12) United States Patent
Seo et al.

(10) Patent No.: US 9,197,401 B2
(45) Date of Patent: Nov. 24, 2015

(54) MULTI-BAND RECEIVER

(71) Applicant: Electronics and Telecommunications Research Institute, Daejeon (KR)

(72) Inventors: Seok Seo, Daejeon (KR); Jinup Kim, Daejeon (KR); Seung-Hwan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/542,842

(22) Filed: Nov. 17, 2014

(65) Prior Publication Data

US 2015/0139371 A1 May 21, 2015

(30) Foreign Application Priority Data

Nov. 19, 2013 (KR) .......... 10-2013-0140993
Oct. 20, 2014 (KR) .......... 10-2014-0141532

(51) Int. Cl.
*H03K 9/00* (2006.01)
*H04L 27/06* (2006.01)
*H04L 7/00* (2006.01)
*H04L 25/06* (2006.01)

(52) U.S. Cl.
CPC ............ *H04L 7/0087* (2013.01); *H04L 7/0033* (2013.01); *H04L 25/06* (2013.01)

(58) Field of Classification Search
USPC ................. 375/219, 222, 229–236, 375/240.26–240.29, 267, 271, 284, 285, 375/278, 295, 299, 302, 316, 340, 346, 350, 375/354, 371, 373, 322
See application file for complete search history.

(56) References Cited

U.S. PATENT DOCUMENTS

| | | | |
|---|---|---|---|
| 2007/0140382 A1 | 6/2007 | Qian | |
| 2011/0140942 A1* | 6/2011 | Pagnanelli | 341/144 |
| 2012/0039417 A1 | 2/2012 | Kim et al. | |
| 2012/0254272 A1* | 10/2012 | Sturza et al. | 708/313 |
| 2014/0043177 A1* | 2/2014 | Pagnanelli | 341/143 |
| 2015/0032788 A1* | 1/2015 | Velazquez et al. | 708/819 |

FOREIGN PATENT DOCUMENTS

KR  1020070066674 B1  6/2007

* cited by examiner

*Primary Examiner* — Linda Wong
(74) *Attorney, Agent, or Firm* — William Park & Associates Ltd.

(57) ABSTRACT

A multi-band receiver according to an embodiment of the present invention includes an analog-to-digital converter configured to convert multi-band analog radio signals into a digital baseband signal, and a first signal extracting unit configured to generate a first path signal by changing a sampling rate of the digital baseband signal and sample-delaying the digital baseband signal, and generate a second path signal by bypassing the digital baseband signal, wherein the first signal extracting unit extracts a first baseband signal using a group delay difference between the first and second path signals caused by a sample delay difference between the first and second path signals.

20 Claims, 8 Drawing Sheets

MULTI-BAND RECEIVER

CROSS-REFERENCE TO RELATED APPLICATIONS

This U.S. non-provisional patent application claims priority under 35 U.S.C. §119 of Korean Patent Application Nos. 10-2013-0140993, filed on Nov. 19, 2013, and 10-2014-0141532, filed on Oct. 20, 2014, the entire contents of which are hereby incorporated by reference.

BACKGROUND OF THE INVENTION

The present invention disclosed herein relates to a wireless signal receiver for wireless communication, and more particularly, to a multi-band receiver for receiving and directly down-converting a plurality of signals transmitted at different bands.

Recently, terminals for wireless communication systems have become more compact and have been improved to satisfy new requirements of various standards of wireless communication. In particular, such terminals are required to support both a multi-band and a multi-mode for improving flexibility, adaptability and cognitivity. Moreover, next-generation wireless communication standards will provide dynamic spectrum allocation and sharing functions to improve the spectrum efficiency and the quality of service (QoS). Furthermore, non-contiguous frequency bands may be allocated to improve the efficiency of use of a spectrum. Such requirements need a technology for receiving signals transmitted at two or more different frequency bands using a single receiver.

Currently, it is required to simultaneously support two or more different communication standards in a single wireless receiver, or, in the case of a communication system such as a cognitive radio communication system, it is required to scan signals at an arbitrary frequency band, while receiving signals of another arbitrary frequency band. However, a typical receiver should be provided with separate receiver circuits or chips for respective modes and respective frequency bands or channels. Therefore, the circuit structure of the receiver is complicated and the unit price of the receiver is high. Therefore, a novel receiver for supporting a multi-band and a multi-mode using a single receiver circuit is required.

A band-pass sampling technology is considered as one of the best alternatives for satisfying such requirements. According to the band-pass sampling technology, sampling is performed at a sampling rate that is at least two times higher than a signal bandwidth so that an RF band signal is directly frequency-converted into a baseband signal. A typical band-pass sampling receiver applies two sampling clocks having relative time delays to two analog-to-digital converts (ADCs) respectively to perform sampling, and then removes an aliasing effect through signal processing. However, since such a band-pass sampling receiver needs two ADCs, the complexity of hardware increases. Furthermore, since a delay time difference between two paths is induced by using analog devices, the performance of hardware may be degraded due to an error of the delay time difference between the paths and irregular signal magnitude.

SUMMARY OF THE INVENTION

The present invention provides a multi-band receiver for simultaneously down-converting multi-band signals at arbitrary frequency bands to receive the signals, while using a single RF chain and a single ADC.

The present invention also provides a multi-band receiver for cancelling interference between two signals at a baseband to separate a desired signal using a single ADC.

The present invention also provides a multi-band receiver provided with a single ADC to have reduced complexity and reduced size compared to a typical receiver for which two ADCs should be used.

The present invention is also directed to preventing the performance degradation caused by a delay time error and signal magnitude irregularity between two paths which occur when using a second order band pass sampling technique for which two ADCs are used.

The present invention also provides a multi-band receiver for scanning a signal at an arbitrary frequency band, while receiving a signal of another arbitrary frequency band using a single receiver circuit.

Embodiments of the present invention provide multi-band receivers including an analog-to-digital converter configured to convert multi-band analog radio signals into a digital baseband signal, and a first signal extracting unit configured to generate a first path signal by changing a sampling rate of the digital baseband signal and sample-delaying the digital baseband signal, and generate a second path signal by bypassing the digital baseband signal, wherein the first signal extracting unit extracts a first baseband signal using a group delay difference between the first and second path signals caused by a sample delay difference between the first and second path signals.

In other embodiments of the present invention, multi-band receivers include an analog-to-digital converter configured to convert multi-band analog radio signals into a digital baseband signal, and a first signal extracting unit configured to generate a first path signal by sample-delaying the digital baseband signal and changing a sampling rate thereof, and generate a second path signal by changing the sampling rate of the digital baseband signal, wherein the first signal extracting unit extracts a first baseband signal using a group delay difference between the first and second path signals caused by a sample delay difference between the first and second path signals.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is not for delimiting the present invention but for describing specific embodiments. The terms of a singular form may include plural forms unless otherwise specified. It will be further understood that the terms "comprise", "comprising,", "include", "including", "have" and/or "having", when used herein, specify the presence of stated features, numbers, steps, operations, elements, components or combinations thereof, but do not preclude the presence or addition of one or more other features, numbers, steps, operations, elements, components or combinations thereof.

The terms used herein, including technical or scientific terms, have the same meanings as understood by those skilled in the art. It will be further understood that terms in common usage should also be interpreted as is customary in the relevant art and not in an idealized or overly formal sense unless otherwise defined herein.

In the description, when it is described that a certain part includes certain elements, the part may further include other elements. The embodiments exemplified and described herein include complementary embodiments thereof. Hereinafter, an embodiment of the present invention will be described in detail with reference to the accompanying drawings.

Figure 1:
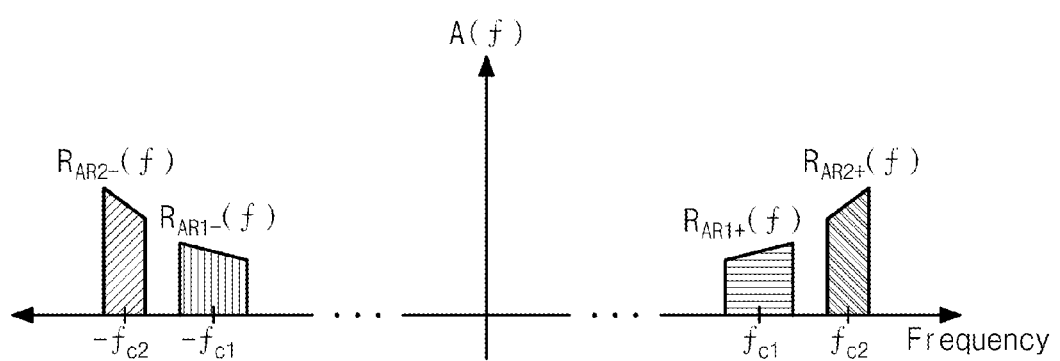
FIG. 1 is a graph illustrating analog spectra of two signals at arbitrary frequency bands.

FIG. 1 is a graph illustrating analog spectra of two signals at arbitrary frequency bands. Referring to FIG. 1, wireless signals transmitted through two frequency bands $f_{c1}$ and $f_{c2}$ may interfere with each other at a baseband after being sampled.

It may be assumed that a first analog RF signal $AR_1$ has a first carrier frequency $f_{c1}$ and a first signal bandwidth $B_1$. It may be assumed that a second analog RF signal $AR_2$ has a second carrier frequency $f_{c2}$ and a second signal bandwidth $B_2$. A spectrum $R_{AR1+}(f)$ represents a positive frequency spectrum component of the first analog RF signal $AR_1$, and a spectrum $R_{AR1-}(f)$ represents a negative frequency spectrum component of the first analog RF signal $AR_1$. A spectrum $R_{AR2+}(f)$ represents a positive frequency spectrum component of the second analog RF signal $AR_2$, and a spectrum $R_{AR2-}(f)$ represents a negative frequency spectrum component of the second analog RF signal $AR_2$.

Figure 2:
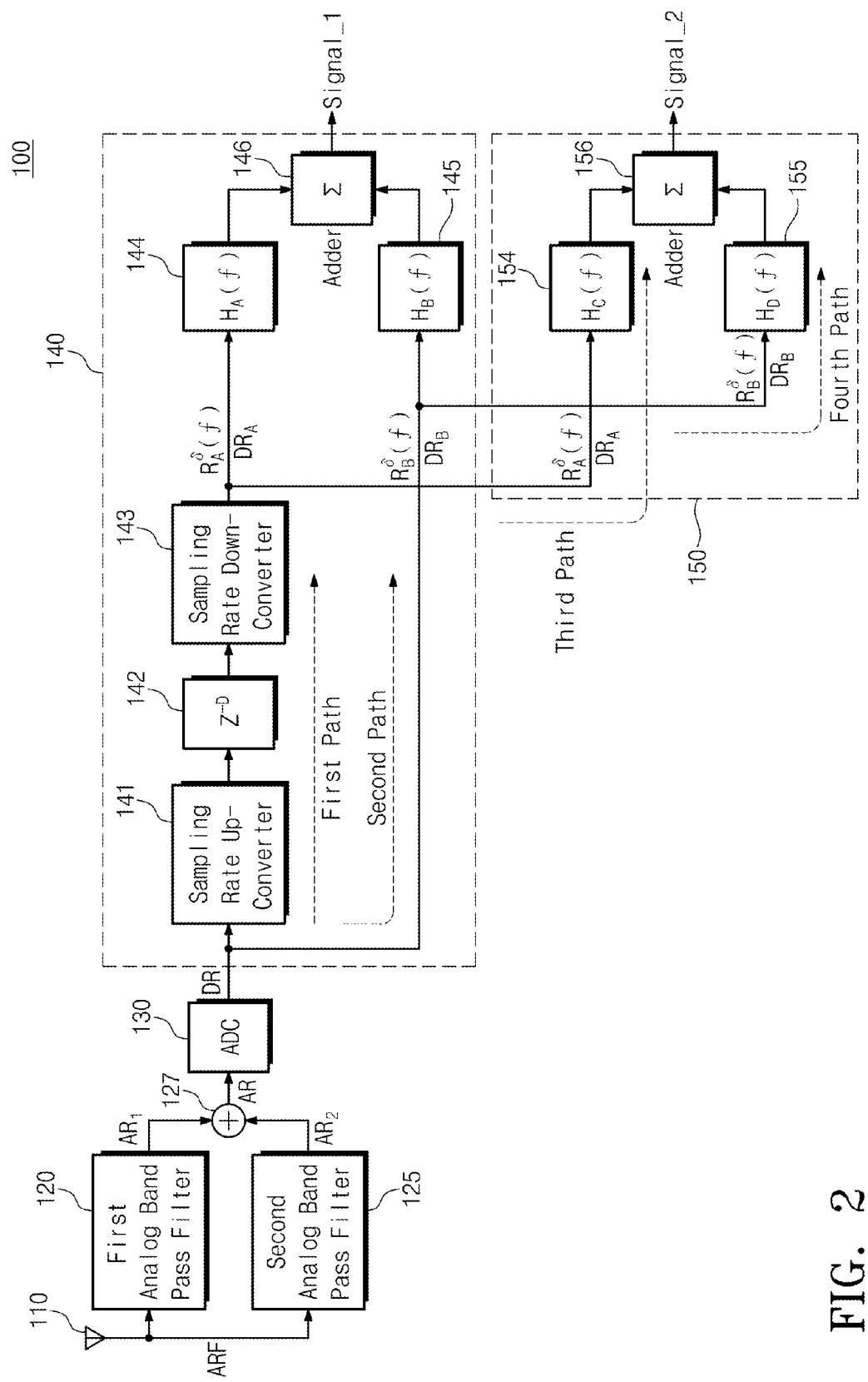
FIG. 2 is a schematic block diagram illustrating a double-band receiver according to a first embodiment of the present invention.

FIG. 2 is a schematic block diagram illustrating a multi-band receiver according to a first embodiment of the present invention. A multi-band receiver 100 of the present invention may include a band-pass sampling receiver. In addition, although a double band is exemplarily illustrated as a multi-band, it may be understood that the present invention is applicable to a multi-band for receiving three or more signals. Referring to FIG. 2, the multi-band receiver 100 of the present invention may include an antenna 110, first and second analog band pass filters 120 and 125, an adder 127, an analog-to-digital converter (ADC) 130, a first signal extracting unit 140 and a second signal extracting unit 150.

The antenna 110 receives an analog RF signal transmitted wirelessly. The received analog RF signal may include signals transmitted at two or more frequency bands. Here, although it is illustrated that the analog RF signal is transmitted through two or more different frequency bands, those skilled in the art could understand that the analog RF signal may be transmitted at three or more bands.

The first and second analog band pass filters 120 and 125 may include broadband pass filters for filtering broadband signals. The first analog band pass filter 120 may be such designed that a passband is limited to the first bandwidth $B_1$. The first analog band pass filter 120 may generate, as a result of filtering, the first analog RF signal $AR_1$ having the first bandwidth $B_1$ and the first carrier frequency $f_{c1}$. The second analog band pass filter 125 may be such designed that a passband is limited to the second bandwidth $B_2$. The second analog band pass filter 125 may generate, as a result of filtering, the second analog RF signal $AR_2$ having the second bandwidth $B_2$ and the second carrier frequency $f_{c2}$. In an exemplary embodiment, the passbands and the passband widths $B_1$ and $B_2$ of the first and second analog band pass filters 120 and 125 may have fixed values or may be adjusted to other values. To this end, the first and second analog band pass filters 120 and 125 may include tunable band pass filters (BPFs).

The adder 127 adds the filtering result of the first analog band pass filter 120 and the filtering result of the second analog band pass filter 125. That is, the adder 127 adds the first analog RF signal $AR_1$ to the second analog RF signal $AR_2$ to generate a multi-band analog RF signal AR, and transfers the multi-band analog RF signal AR to the ADC 130.

The ADC 130 converts the multi-band analog RF signal AR to a digital baseband signal DR. The ADC 130 samples the multi-band analog RF signal AR on the basis of a sampling rate $f_s$. Furthermore, data obtained through the sampling is quantized by the ADC 130 and is output as the multi-band digital baseband signal DR.

The first signal extracting unit 140 and the second signal extracting unit 150 respectively separate a first signal signal__1 and a second signal signal__2 from the digital baseband signal DR output from the ADC 130.

The first signal extracting unit 140 may include a sampling rate up-converter 141, a sample delayer 142, a sampling rate down-converter 143, a first digital filter 144, a second digital filter 145 and an adder 146. The baseband signal DR obtained through the sampling of the ADC 130 may pass through two signal paths so as to be processed. That is, the baseband signal DR passes through a first path including the sampling rate up-converter 141, the sample delayer 142, the sampling rate down-converter 143 and the first digital filter 144 and passes through a second path including the second digital filter 145 so as to be added to each other in the adder 146. The signals output from the first and second paths are added to each other in the adder 146 so as to be output as the first signal signal__1. The first signal signal__1 is a baseband signal obtained by removing one of signals transmitted at multiple bands.

In the first signal extracting unit 140, the digital baseband signal DR output from the ADC 130 is divided into a first path signal processed through the first path and a second path signal processed through the second path. While the digital baseband signal DR passes through the first path, the sampling rate is increased by N times, a specific number of samples (e.g., one sample) is delayed, and then the sampling rate is decreased by N times. The first path signal is provided to the adder 146 after being processed by the first digital filter 144.

In addition, the digital baseband signal DR passes through the second path so as to be transferred as the second path signal. The digital baseband signal DR passes through the second digital filter 145 in the second path without undergoing sample delay or change in a sampling rate.

Here, a value obtained by multiplying the up-sampling rate N of the sampling rate up-converter 141 included in the first path by the down-sampling rate 1/N of the sampling rate down-converter 143 may be 1. That is, the sampling rate of the first path signal that has passed through the sampling rate up-converter 141 and the sampling rate down-converter 143 is equal to the sampling rate of the output of the ADC 130. Furthermore, the first path signal is delayed by the sample delayer 142 arranged between the sampling rate up-converter 141 and the sampling rate down-converter 143. The sample delayer 142 delays the first path signal by as much as D samples. Here, a delay amount D of the sample delayer 142 may be an integer that is greater than 0 and smaller than the denominator of the down-sampling rate, i.e., N.

The signal that has been delayed by as much as D samples by the sample delayer 142 is down-sampled by the sampling rate down-converter 143 so that the sampling rate is decreased by 1/N times. An output signal of the sampling rate down-converter 143 is provided to the first digital filter 144. The digital baseband signal DR output from the ADC 130 is processed by the second digital filter 145 included in the second path so as to be provided to the adder 146. Here, the first digital filter 144 and the second digital filter 145 are designed on the basis of a relative sample delay difference between the first and second paths or fractional delay. A second baseband signal DR2 may be removed and a first baseband signal DR1 may be extracted using the first and second digital filters 144 and 145 and the adder 146.

The relative sample delay difference between the first and second paths and the fractional delay are presented as different group delays in multi-band signals at different frequency bands. Even though two signals interfere with each other at a baseband, a multi-band signal may be separated using an effect of the different group delays. The first and second digital filters 144 and 145 are designed in consideration of such a characteristic.

The second signal extracting unit 150 may include a third digital filter 154, a fourth digital filter 155 and an adder 156. An output signal of the sampling rate down-converter 143 may pass through a third path including the third digital filter 154. The baseband signal DR obtained through the sampling of the ADC 130 passes through a fourth path including the fourth digital filter 155 so as to be provided to the adder 156. The signals output from the third and fourth paths are added to each other in the adder 156 so as to be output as the second signal signal_2.

In the second signal extracting unit 150, a baseband signal $DR_A$ transferred to the third path affected by sample delay is processed by the third digital filter 154. A baseband signal $DR_B$ transferred to the fourth path where sample delay does not occur is processed by the fourth digital filter 155. The third and fourth digital filters 154 and 155 may be such designed that one of the baseband signals $DR_A$ and $DR_B$ is removed using different fractional delay effects of the baseband signals $DR_A$ and $DR_B$.

When the output signals of the third and fourth digital filters 154 and 155 are added to each other by the adder 156, the second signal signal_2 is extracted.

According to the above-mentioned configurations of the first and second signal extracting units 140 and 150, even though the first and second baseband signals $DR_1$ and $DR_2$ interfere with each other, such interference may be cancelled so that the first and second baseband signals $DR_1$ and $DR_2$ may be extracted substantially simultaneously and completely. Therefore, both a multi-band and a multi-mode may be supported using a single receiver circuit, without providing an additional receiver circuit for each signal band. In particular, since a single ADC is used in the receiver circuit of the present invention, the complexity of hardware of the receiver is decreased, the degree of integration of the circuit is increased, and the size of the receiver is decreased, so that the unit price of the receiver is decreased and the power consumption thereof is reduced.

Accordingly, the multi-band receiver of the present invention may simultaneously receive two or more signals having arbitrary frequency bands and signal bandwidths by using a single receiver circuit. Furthermore, in a communication system such as a cognitive ratio communication system, the multi-band receiver of the present invention may provide a function for scanning a signal at an arbitrary frequency band while receiving a signal of another arbitrary frequency band.

Hereinafter, a method of designing the first and second digital filters 144 and 145 using an effect of different fractional delays will be described.

Figure 3:
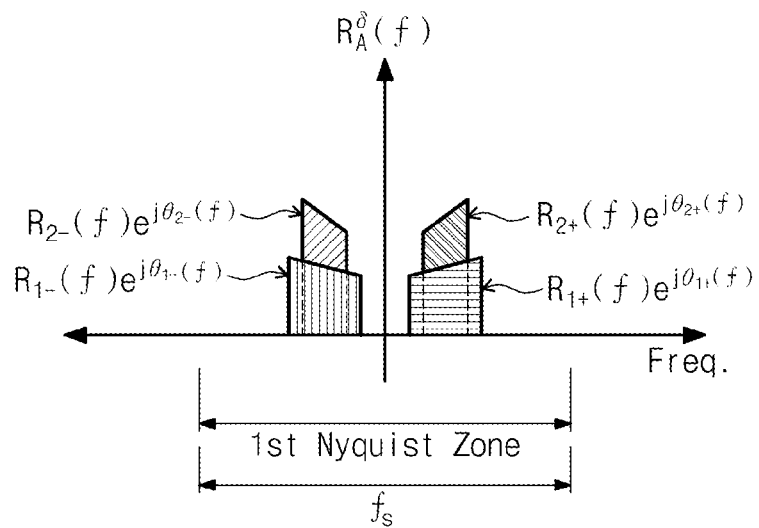
FIG. 3 is a graph illustrating a spectrum $R_A^\delta(f)$ of a first path signal $DR_A$ output from the sampling rate down-converter of FIG. 2.
Figure 4:
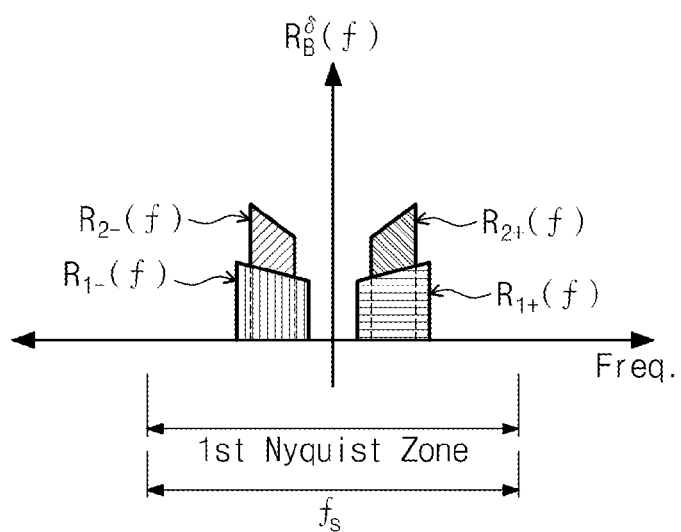
FIG. 4 is a graph illustrating a spectrum $R_B^\delta(f)$ of a second path signal $DR_B$ illustrated in FIG. 2.

FIG. 3 is a graph exemplarily illustrating a spectrum $R_A^\delta(f)$ of the first path signal $DR_A$ output from the sampling rate down-converter 143 of FIG. 2. FIG. 4 is a graph exemplarily illustrating a spectrum $R_B^\delta(f)$ of the second path signal $DR_B$ corresponding to the spectrum of the digital baseband signal DR. Here, the spectrum $R_A^\delta(f)$ of the first path signal $DR_A$ represents the spectrum of a signal obtained by processing the digital baseband signal DR through the sampling rate up-converter 141, the sample delayer 142 and the sampling rate down-converter 143. The spectrum $R_A^\delta(f)$ of the first path signal $DR_A$ indicates a signal to which a fractional delay of D/N is applied compared to the second path signal. As a result, the first path signal $DR_A$ has the same processing effect as that of applying a group delay to the second path signal $DR_B$.

Referring to the spectra illustrated in FIGS. 3 and 4, it may be understood that interference may occur on the first and second baseband signals $DR_1$ and $DR_2$ constituting the first path signal $DR_A$ and the first and second baseband signals $DR_1$ and $DR_2$ constituting the second path signal $DR_B$. That is, the first and second baseband signals $DR_1$ and $DR_2$ may interfere with each other at a baseband. Nonetheless, the multi-band receiver 100 (see FIG. 2) of the present invention may cancel the interference between the first and second baseband signals $DR_1$ and $DR_2$ and may correctly extract the first and second baseband signals $DR_1$ and $DR_2$.

It is exemplarily described herein how the first and second baseband signals $DR_1$ and $DR_2$ are extracted when the first and second baseband signals $DR_1$ and $DR_2$ interfere with each other. Herein, the first and second path signals $DR_A$ and $DR_B$ have signal characteristics as described below.

An effect of group delay due to time delay of the first baseband signal $DR_1$ included in the first path signal $DR_A$ may be expressed as Equation (1) and Equation (2). Equation (1) represents an image component of the first baseband signal $DR_1$ transitioned from a negative band, and Equation (2) represents an image component of the first baseband signal $DR_1$ transitioned from a positive band.

$$e^{j\theta_{1-}(f)} = e^{j2\pi n_1 D/N} e^{-j2\pi Df/f_s} \quad (1)$$

$$e^{j\theta_{1+}(f)} = e^{-j2\pi n_1 D/N} e^{-j2\pi Df/f_s} \quad (2)$$

Where $n_1$ denotes a frequency band position index and may have an integer value of 0, 1, 2, 3, . . . . D denotes an amount of sample delay, and N denotes a conversion rate of the sampling rate down-converter 143.

An effect of group delay of the second baseband signal $DR_2$ included in the first path signal $DR_A$ may be expressed as Equation (3) and Equation (4). Equation (3) represents an image component of the first baseband signal $DR_2$ transitioned from a negative band, and Equation (4) represents an image component of the first baseband signal $DR_2$ transitioned from a positive band.

$$e^{j\theta_{2-}(f)} = e^{j2\pi n_2 D/N} e^{-j2\pi Df/f_s} \quad (3)$$

$$e^{j\theta_{2+}(f)} = e^{-j2\pi n_2 D/N} e^{-j2\pi Df/f_s} \quad (4)$$

Where $n_2$ denotes a frequency band position index of the second analog RF signal $AR_2$ and may have an integer value of 0, 1, 2, 3, . . . .

$n_1$ and $n_2$ may be expressed as Equation (5) by the carrier frequencies $f_{c1}$ and $f_{c2}$ of the first and second analog RF signals $AR_1$ and $AR_2$ and the sampling rate $f_s$ of the ADC 130 (see FIG. 2).

$$n_1 = \text{round}\left(\frac{f_{c1}}{f_s}\right) \quad (5)$$

$$n_2 = \text{round}\left(\frac{f_{c2}}{f_s}\right)$$

Where a round function round(x) represents rounding off of x.

Signals of two bands may be separated using a delay difference between the first and second path signals $DR_A$ and $DR_B$ and an effect of group delay between the first and second baseband signals $DR_1$ and $DR_2$. For the purpose of this process, the response characteristics of the first and second digital filters 144 and 145 and the third and fourth digital filters 154 and 155 are designed.

A spectrum $R_A^\delta(f)$ of the first path signal $DR_A$ output from the sampling rate down-converter 143 at a first Nyquist zone may be expressed as Equation (6).

$$R_A^\delta(f) = f_s \begin{Bmatrix} R_{1-}(f)e^{j2\pi n_1 D/N} e^{-j2\pi Df/f_s} + \\ R_{1+}(f)e^{-j2\pi n_1 D/N} e^{-j2\pi Df/f_s} + \\ R_{2-}(f)e^{j2\pi n_2 D/N} e^{-j2\pi Df/f_s} + \\ R_{2+}(f)e^{-j2\pi n_2 D/N} e^{-2\pi Df/f_s} \end{Bmatrix} \quad (6)$$

Furthermore, a spectrum $R_B^\delta(f)$ of the second path signal $DR_B$ output from the ADC 130 at a first Nyquist zone may be expressed as Equation (7).

$$R_B^\delta(f) = f_s\{R_{1-}(f) + R_{1+}(f) + R_{2-}(f) + R_{2+}(f)\} \quad (7)$$

Spectra of signals processed by the first and second digital filters 144 and 145 may be expressed as Equation (8) and Equation (9).

$$R_A^\delta(f) = f_s H_A(f) \begin{Bmatrix} R_{1-}(f)e^{j2\pi n_1 D/N} e^{-j2\pi Df/f_s} + \\ R_{1+}(f)e^{-j2\pi n_1 D/N} e^{-j2\pi Df/f_s} + \\ R_{2-}(f)e^{j2\pi n_2 D/N} e^{-j2\pi Df/f_s} + \\ R_{2+}(f)e^{-j2\pi n_2 D/N} e^{-2\pi Df/f_s} \end{Bmatrix} \quad (8)$$

$$S_B^\delta(f) = f_s H_B(f)\{R_{1-}(f) + R_{1+}(f) + R_{2-}(f) + R_{2+}(f)\} \quad (9)$$

A spectrum of an output signal of the adder 146 is expressed as Equation (10).

$$S(f) = S_A^\delta(f) + S_B^\delta(f) \quad (10)$$

Here, Equation (11) may be satisfied to remove the second baseband signal $DR_2$ and extract the first baseband signal $DR_1$.

$$S(f) = S_A^\delta(f) + S_B^\delta(f) \quad (11)$$
$$= R_{1-}(f) + R_{1+}(f)$$

By solving Equation (11), frequency responses of the first and second digital filters 144 and 145 may be expressed as Equation (12) and Equation (13).

$$H_A(f) = \begin{cases} \dfrac{e^{j2\pi Df/f_s}}{f_s(e^{j2\pi n_1 D/N} - e^{j2\pi n_2 D/N})}, & -\dfrac{f_s}{2} < f < 0 \\ \dfrac{e^{j2\pi Df/f_s}}{f_s(e^{-j2\pi n_1 D/N} - e^{-j2\pi n_2 D/N})}, & 0 < f < \dfrac{f_s}{2} \end{cases} \quad (12)$$

$$H_B(f) = \begin{cases} \dfrac{1}{f_s(1 - e^{j2\pi(n_1-n_2)D/N})}, & -\dfrac{f_s}{2} < f < 0 \\ \dfrac{1}{f_2(1 - e^{-j2\pi(n_1-n_2)D/N})}, & 0 < f < \dfrac{f_s}{2} \end{cases} \quad (13)$$

In the same manner, frequency responses of the third and fourth digital filters 154 and 155 may be expressed as Equation (14) and Equation (15).

$$H_C(f) = \begin{cases} \dfrac{e^{j2\pi Df/f_s}}{f_s(e^{j2\pi n_2 D/N} - e^{j2\pi n_1 D/N})}, & -\dfrac{f_s}{2} < f < 0 \\ \dfrac{e^{j2\pi Df/f_s}}{f_s(e^{-j2\pi n_2 D/N} - e^{-j2\pi n_1 D/N})}, & 0 < f < \dfrac{f_s}{2} \end{cases} \quad (14)$$

$$H_D(f) = \begin{cases} \dfrac{1}{f_s(1 - e^{j2\pi(n_2-n_1)D/N})}, & -\dfrac{f}{2} < f < 0 \\ \dfrac{1}{f_s(1 - e^{-j2\pi(n_2-n_1)D/N})}, & 0 < f < \dfrac{f_s}{2} \end{cases} \quad (15)$$

Digital filters may be designed using the above-mentioned relationship between the first and second path signals $DR_A$ and $DR_B$ and the effect of relative group delay between the first and second baseband signals $DR_1$ and $DR_2$ included in the first path signal $DR_A$. That is, the first to fourth digital filters 144, 145, 154 and 155 are designed in consideration of the group delay, so that the first and second baseband signals $DR_1$ and $DR_2$ are separated. In an exemplary embodiment, the first to fourth digital filters 144, 145, 154 and 155 may be implemented with finite impulse response (FIR) filters.

Furthermore, as shown in Equations (13) and (15), $H_B(f)$ and $H_D(f)$ are not frequency functions but constants. Therefore, it may be understood that the second and fourth digital filters 145 and 155 may be implemented with multipliers. In this case, a synchronous delayer may also be provided to make a delay by as much as a delay time caused by signal processing in the sampling rate up-converter 141, the sampling rate down-converter 143 and the first or third digital filter 144 or 154.

Figure 5:
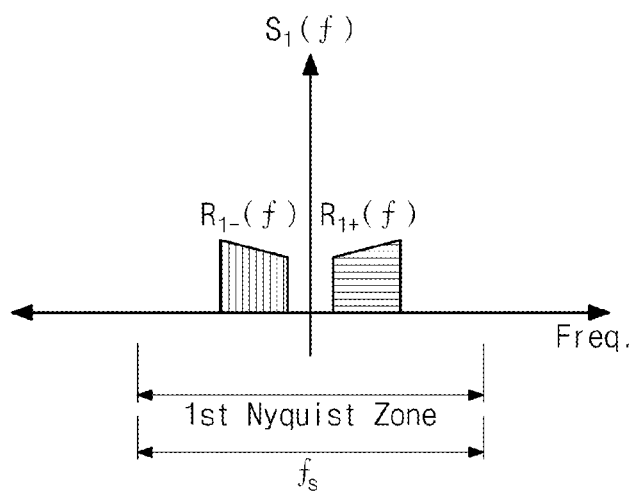
FIG. 5 is a graph illustrating a spectrum of the first baseband signal $DR_1$ output from the adder 146 of FIG. 2.

FIG. 5 is a graph illustrating a spectrum of the first baseband signal $DR_1$ output from the adder 146. Referring to FIG. 5, it may be understood that the second baseband signal $DR_2$ is removed and only the first baseband signal $DR_1$ is extracted. According to the present invention, the first baseband signal $DR_1$ may be extracted using the first and second digital filters 144 and 145 and the adder 146.

Figure 6:
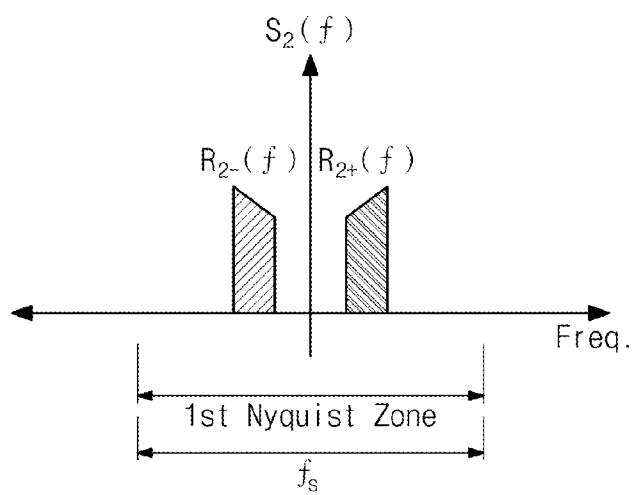
FIG. 6 is a graph illustrating a spectrum of the second baseband signal $DR_2$ output from the adder 156 of FIG. 2.

FIG. 6 is a graph illustrating a spectrum of the second baseband signal $DR_2$ output from the adder 156. Referring to FIG. 6, it may be understood that the first baseband signal $DR_1$ is removed and only the second baseband signal $DR_2$ is extracted. The second baseband signal $DR_2$ may be extracted using the third and fourth digital filters 154 and 155 and the adder 156.

Figure 7:
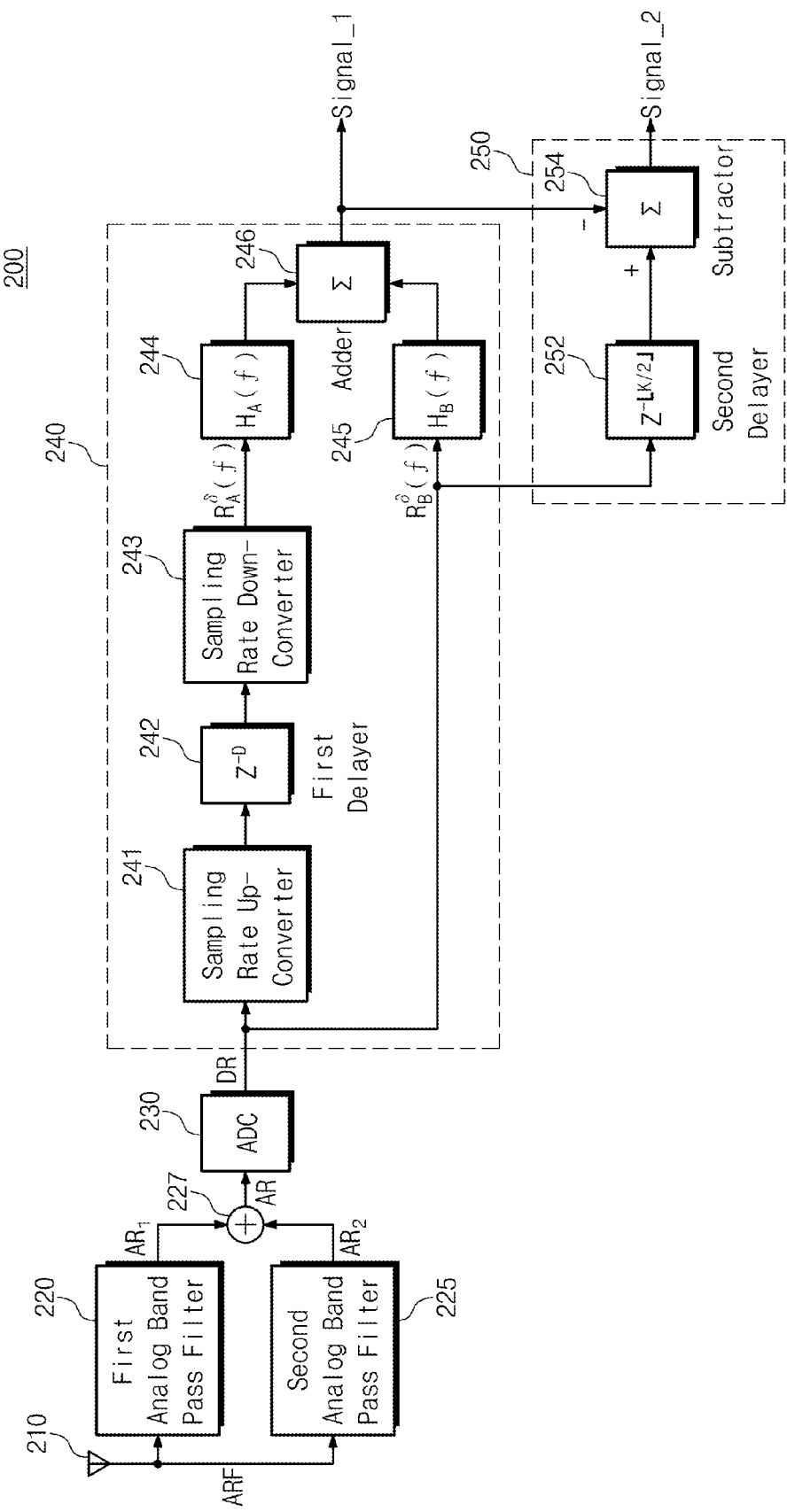
FIG. 7 is a schematic block diagram illustrating a double-band receiver according to a second embodiment of the present invention.

FIG. 7 is a schematic block diagram illustrating a multi-band receiver 200 according to a second embodiment of the present invention. Referring to FIG. 7, the multi-band receiver 200 of the present invention may include an antenna 210, first and second analog band pass filters 220 and 225, an adder 227, an ADC 230, a first signal extracting unit 240 and a second signal extracting unit 250. Here, the antenna 210, the first and second analog band pass filters 220 and 225, the adder 227, the ADC 230 and the first signal extracting unit 240 are substantially the same as those of FIG. 2. Therefore, detailed descriptions of the foregoing elements are omitted.

A first signal signal__1 may be generated by an adder 246 that adds outputs of first and second digital filters 244 and 245. A second signal signal__2 may be extracted by subtracting the first signal signal__1 that is an output of the adder 246 from an output of the ADC 230. Here, it is assumed that the first and second digital filters 244 and 245 are provided as FIR filters having a sampling rate tap length of K. In this case, the first signal signal__1 that is the output of the adder 246 undergoes a sample delay of round(K/2) compared to the output of the ADC 230 which does not pass through a digital filter. Therefore, if the output of the ADC 230 is sample-delayed by as much as round(K/2) using a second layer 252, it may be synchronized with the first signal signal__1 in a subtractor 254. When the first signal signal__1 is subtracted from the output of the ADC 230, which has been delayed by as much as round(K/2), by the subtractor 254, the second signal signal__2 is extracted. A spectrum of the second signal signal__2 is illustrated in FIG. 6.

Figure 8:
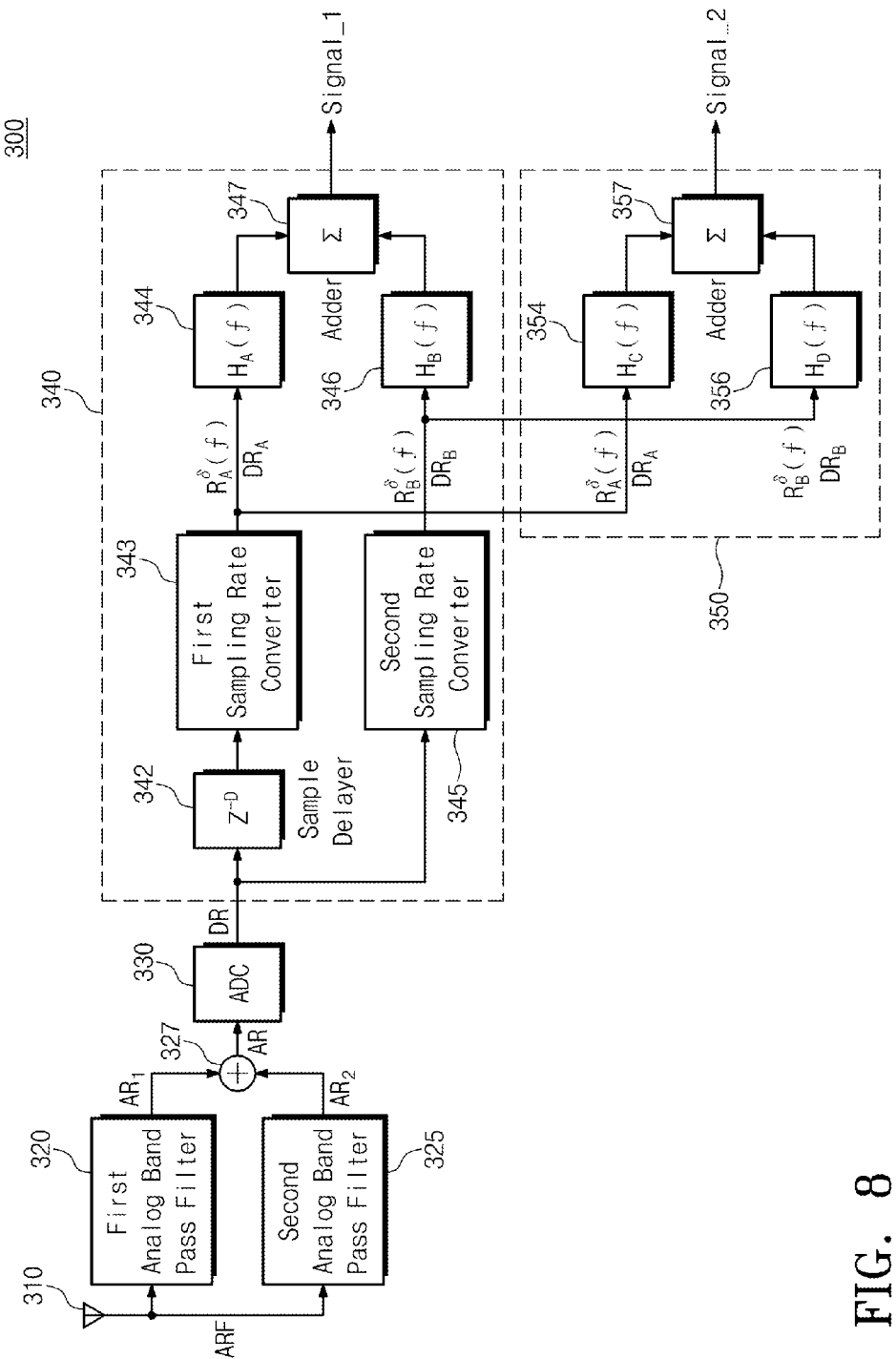
FIG. 8 is a schematic block diagram illustrating a double-band receiver according to a third embodiment of the present invention.

FIG. 8 is a schematic block diagram illustrating a multi-band receiver 300 according to a third embodiment of the present invention. In addition, although a double band is exemplarily illustrated as a multi-band, it may be understood that the present invention is applicable to a multi-band for receiving three or more signals. Referring to FIG. 8, the multi-band receiver 300 of the present invention may include an antenna 310, first and second analog band pass filters 320 and 325, an adder 327, an ADC 330, a first signal extracting unit 340 and a second signal extracting unit 350.

The antenna 310 receives an analog RF signal transmitted wirelessly. The received analog RF signal may include at least two frequency bands.

The first and second analog band pass filters 320 and 325 may include broadband pass filters for filtering broadband signals. The first analog band pass filter 320 may be such designed that a passband is limited to the first bandwidth $B_1$. The first analog band pass filter 320 may generate, as a result of filtering, the first analog RF signal $AR_1$ having the first bandwidth $B_1$ and the first carrier frequency $f_{c1}$. The second analog band pass filter 325 may be such designed that a passband is limited to the second bandwidth $B_2$. The second analog band pass filter 325 may generate, as a result of filtering, the second analog RF signal $AR_2$ having the second bandwidth $B_2$ and the second carrier frequency $f_{c2}$. In an exemplary embodiment, the passbands and the passband widths $B_1$ and $B_2$ of the first and second analog band filters 320 and 325 may have fixed values or may be adjusted to other values. To this end, the first and second analog band pass filters 320 and 325 may include tunable band pass filters (BPFs).

The adder 327 adds the filtering result of the first analog band pass filter 320 and the filtering result of the second analog band pass filter 325. The analog signals filtered by the adder 327 are transferred as a multi-band analog RF signal AR to the ADC 330.

The ADC 330 samples the multi-band analog RF signal AR to output a digital baseband signal DR. The ADC 330 samples the multi-band analog RF signal AR on the basis of a sampling rate L. Furthermore, a sampled signal is quantized by the ADC 330 and is output as the multi-band digital baseband signal DR.

The first signal extracting unit 340 and the second signal extracting unit 350 respectively separate a first signal signal__1 and a second signal signal__2 from the digital baseband signal DR output from the ADC 330.

The first signal extracting unit 340 includes a sample delayer 342, a first sampling rate converter 343, a first digital filter 344, a second sampling rate converter 345, a second digital filter 346 and an adder 347. The output of the ADC 330 is allowed to pass through two signal paths by the first signal extracting unit 340. That is, the output of the ADC 330 is divided to be transferred to a first path including the sample delayer 342 and a second path where delay does not occur.

The first and second paths include the first and second sampling rate converters 343 and 345 respectively. The first and second sampling rate converters 343 and 345 may adjust sampling rates of input signals by L/M times. That is, sampling rates $f_s'$ of baseband signals $DR_A$ and $DR_B$ obtained through the ADC 330 and the first and second sampling rate converters 343 and 345 may be expressed as Equation (16).

$$f_s' = f_s \frac{L}{M} \tag{16}$$

Where L and M are natural numbers and L<M.

Therefore, the baseband signal $DR_A$ transferred to the first digital filter 344 has a fractional delay of LD/M due to the sample delayer 342 and the first sampling rate converter 343. Such a fractional delay may greatly contribute to cancellation of interference. Furthermore, according to settings of the sampling rates of the first and second sampling rate converters 343 and 345, sampling rate selection of the ADC 330 may be more flexible.

When the baseband signals $DR_A$ and $DR_B$ processed by the sampling rate converters 343 and 345 are filtered by the digital filters 344 and 346 and are added to each other by the adder 347, an interfering baseband signal is removed. That is, the adder 347 outputs the first signal signal__1 obtained by extracting one of the baseband signals. Response characteristics of the digital filters 344 and 346 will be described later with reference to FIGS. 9 and 10.

The second signal extracting unit 350 may include a third digital filter 354, a fourth digital filter 356 and an adder 357. An output signal of the first sampling rate converter 343 may pass through a third path including the third digital filter 354. An output signal of the second sampling rate converter 345 passes through a fourth path including the fourth digital filter 356 and is added to another signal in the adder 357. The signals output from the third and fourth paths are added to each other in the adder 357 so as to be output as the second signal signal_2.

When the baseband signals $DR_A$ and $DR_B$ processed by the sampling rate converters 353 and 355 are filtered by the digital filters 354 and 356 and are added to each other by the adder 357, an interfering baseband signal is removed. That is, the adder 357 outputs the second signal signal_2 obtained by extracting one of the baseband signals.

Figure 9:
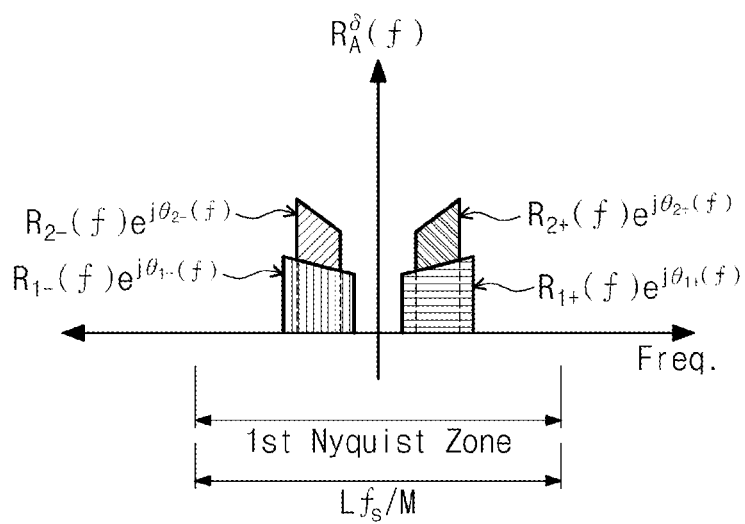
FIG. 9 is a graph illustrating a spectrum $R_A^\delta(f)$ of the first path signal $DR_A$ output from the first sampling rate converter of FIG. 8.
Figure 10:
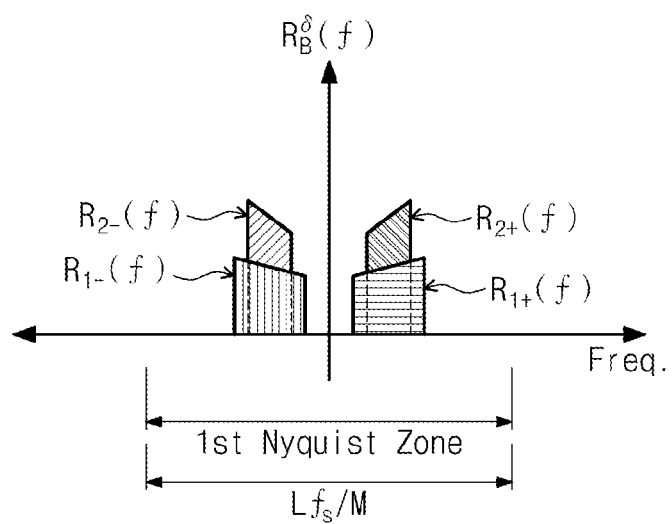
FIG. 10 is a graph illustrating a spectrum $R_B^\delta(f)$ of the second path signal $DR_B$ output from the second sampling rate converter of FIG. 8.

FIG. 9 is a graph exemplarily illustrating a spectrum $R_A^\delta(f)$ of the first path signal $DR_A$ output from the first sampling rate converter 343 of FIG. 8. FIG. 10 is a graph exemplarily illustrating a spectrum $R_B^\delta(f)$ of the second path signal $DR_B$ output from the second sampling rate converter 345 of FIG. 8.

The spectrum $R_A^\delta(f)$ of the first path signal $DR_A$ illustrated in FIG. 9 represents the spectrum of a signal obtained by processing the digital baseband signal DR that is the output of the ADC 330 through the sample delayer 342 the first sampling rate converter 343. That is, the spectrum $R_A^\delta(f)$ of the first path signal $DR_A$ indicates a signal to which a fractional delay of LD/M is applied. As a result, the first path signal $DR_A$ has the same processing effect as that of applying a group delay to the second path signal $DR_B$.

Referring to the spectra illustrated in FIGS. 9 and 10, the first and second baseband signals $DR_1$ and $DR_2$ constituting the first path signal $DR_A$ may interfere with each other. Furthermore, it may be understood that the first and second baseband signals $DR_1$ and $DR_2$ constituting the second path signal $DR_B$ may interfere with each other. That is, the first and second baseband signals $DR_1$ and $DR_2$ may interfere with each other at a baseband. Nonetheless, the multi-band receiver 300 (see FIG. 8) of the present invention may cancel the interference between the first and second baseband signals $DR_1$ and $DR_2$ and may correctly extract the first and second baseband signals $DR_1$ and $DR_2$.

It is exemplarily described herein how the first and second baseband signals $DR_1$ and $DR_2$ are extracted when the first and second baseband signals $DR_1$ and $DR_2$ interfere with each other. Herein, the first and second path signals $DR_A$ and $DR_B$ have signal characteristics as described below.

An effect of group delay due to time delay of the first baseband signal $DR_1$ included in the first path signal $DR_A$ may be expressed as Equation (17) and Equation (18). Equation (17) represents an image component of the first baseband signal $DR_1$ transitioned from a negative band, and Equation (18) represents an image component of the first baseband signal $DR_1$ transitioned from a positive band.

$$e^{j\theta_{1-}(f)} = e^{j2\pi n_1 LD/M} e^{-j2\pi LDf/(Mf_s')} \tag{17}$$

$$e^{j\theta_{1+}(f)} = e^{-j2\pi n_1 LD/M} e^{-j2\pi LDf/(Mf_s')} \tag{18}$$

Furthermore, an effect of group delay of the second baseband signal $DR_2$ included in the first path signal $DR_A$ may be expressed as Equation (19) and Equation (20). Equation (19) represents an image component of the second baseband signal $DR_2$ transitioned from a negative band, and Equation (20) represents an image component of the second baseband signal $DR_2$ transitioned from a positive band.

$$e^{j\theta_{2-}(f)} = e^{j2\pi n_2 LD/M} e^{-j2\pi LDf/(Mf_s')} \tag{18}$$

$$e^{j\theta_{2+}(f)} = e^{-j2\pi n_2 LD/M} e^{-j2\pi LDf/(Mf_s')} \tag{19}$$

Where $n_1$ and $n_2$ denote frequency band position indices of the first and second analog RF signal $AR_1$ and $AR_2$ and may have an integer value of 0, 1, 2, 3, . . . .

$n_1$ and $n_2$ may be expressed as Equation (21) by the carrier frequencies $f_{c1}$ and $f_{c2}$ of the first and second analog RF signals $AR_1$ and $AR_2$ and the sampling rates ($f_s' = Lf_s/M$) of the sampling rate converters 343 and 345.

$$n_1 = \text{round}\left(\frac{f_{c1}}{Lf_s/M}\right) \tag{21}$$

$$n_2 = \text{round}\left(\frac{f_{c2}}{Lf_s/M}\right)$$

Where a round function round(x) represents rounding off of x.

Signals of two bands may be separated using a delay difference between the first and second path signals $DR_A$ and $DR_B$ and an effect of group delay between the first and second baseband signals $DR_1$ and $DR_2$. That is, by designing the first and second digital filters 344 and 346 and the third and fourth digital filters 354 and 356 as described above, interference between two signals may be cancelled.

Hereinafter, a method of designing the digital filters 344 and 346 for cancelling interference between the first and second path signals $DR_A$ and $DR_B$ and extracting a desired signal will be described. A spectrum $R_A^\delta(f)$ of the first path signal $DR_A$ output from the first sampling rate converter 343 at a first Nyquist zone may be expressed as Equation (22).

$$R_A^\delta(f) = f_s' \left\{ \begin{array}{l} R_{1-}(f)e^{j2\pi n_1 LD/M} e^{-j2\pi LDf/(Mf_s')} + \\ R_{1+}(f)e^{-j2\pi n_1 LD/M} e^{-j2\pi LDf/(Mf_s')} + \\ R_{2-}(f)e^{j2\pi n_2 LD/M} e^{-j2\pi LDf/(Mf_s')} + \\ R_{2+}(f)e^{-j2\pi n_2 LD/M} e^{-j2\pi LDf/(Mf_s')} \end{array} \right\} \tag{22}$$

Furthermore, a spectrum $R_B^\delta(f)$ of the second path signal $DR_B$ output from the second sampling rate converter 345 at a first Nyquist zone may be expressed as Equation (23).

$$S_B^\delta(f) = f_s'\{R_{1-}(f) + R_{1+}(f) + R_{2-}(f) + R_{2+}(f)\} \tag{23}$$

Spectra of signals processed by the first and second digital filters 344 and 345 may be expressed as Equation (24) and Equation (25).

$$R_A^\delta(f) = f_s' H_A(f) \left\{ \begin{array}{l} R_{1-}(f)e^{j2\pi n_1 LD/M} e^{-j2\pi LDf/(Mf_s')} + \\ R_{1+}(f)e^{-j2\pi n_1 LD/M} e^{-j2\pi LDf/(Mf_s')} + \\ R_{2-}(f)e^{j2\pi n_2 LD/M} e^{-j2\pi LDf/(Mf_s')} + \\ R_{2+}(f)e^{-j2\pi n_2 LD/M} e^{-j2\pi LDf/(Mf_s')} \end{array} \right\} \tag{24}$$

$$S_B^\delta(f) = f_s' H_B(f)\{R_{1-}(f) + R_{1+}(f) + R_{2-}(f) + R_{2+}(f)\} \tag{25}$$

A spectrum of an output signal of the adder 347 is expressed as Equation (26).

$$S(f) = S_A^\delta(f) + S_B^\delta(f) \tag{26}$$

Here, Equation (27) may be satisfied to remove the second baseband signal $DR_2$ and extract the first baseband signal $DR_1$.

$$S(f) = S_A^\delta(f) + S_B^\delta(f) \quad (27)$$
$$= R_{1-}(f) + R_{1+}(f)$$

By solving Equation (27), frequency responses of the first and second digital filters 344 and 346 may be expressed as Equation (28) and Equation (29).

$$H_A(f) = \begin{cases} \dfrac{e^{j2\pi LDf/(Mf_s')}}{f_s'(e^{j2\pi n_1 LD/M} - e^{j2\pi n_2 LD/M})}, & -\dfrac{f_s'}{2} < f < 0 \\ \dfrac{e^{j2\pi LDf/(Mf_s')}}{f_s'(e^{-j2\pi n_1 LD/M} - e^{-j2\pi n_2 LD/M})}, & 0 < f < \dfrac{f_s'}{2} \end{cases} \quad (28)$$

$$H_B(f) = \begin{cases} \dfrac{1}{f_s'(1 - e^{j2\pi(n_1 - n_2)LD/M})}, & -\dfrac{f_2'}{2} < f < 0 \\ \dfrac{1}{f_2'(1 - e^{-j2\pi(n_1 - n_2)LD/M})}, & 0 < f < \dfrac{f_s'}{2} \end{cases} \quad (29)$$

In the same manner, the third and fourth digital filters 354 and 356 may be designed.

The above-mentioned relationship between the first and second path signals $DR_A$ and $DR_B$ and the effect of relative group delay between the first and second baseband signals $DR_1$ and $DR_2$ included in the first path signal $DR_A$ may be used to digital filters. Since the first to fourth digital filters 344, 346, 354 and 356 are designed using group delay, the first and second baseband signals $DR_1$ and $DR_2$ may be separated. In an exemplary embodiment, the first to fourth digital filters 344, 346, 354 and 356 may be implemented with FIR filters.

Furthermore, as shown in Equation (29), $H_B(f)$ is not a frequency function but a constant. Therefore, it may be understood that the second and fourth digital filters 346 and 356 may be implemented with multipliers. In addition, a synchronous delayer may also be provided to make a delay by as much as a delay time generated during the filtering process performed by the first digital filter 344.

The first to fourth digital filters 344, 346, 354 and 356 may be implemented with filters having an operating frequency ($f_s' = Lf_s/M$). Furthermore, the coefficients of the digital filters may be recalculated according to the two wireless frequency bands $B_1$ and $B_2$. The first to fourth digital filters 344, 346, 354 and 356 may be reconfigured using the recalculated coefficients so as to receive multi-band signals at arbitrary bands.

Figure 11:
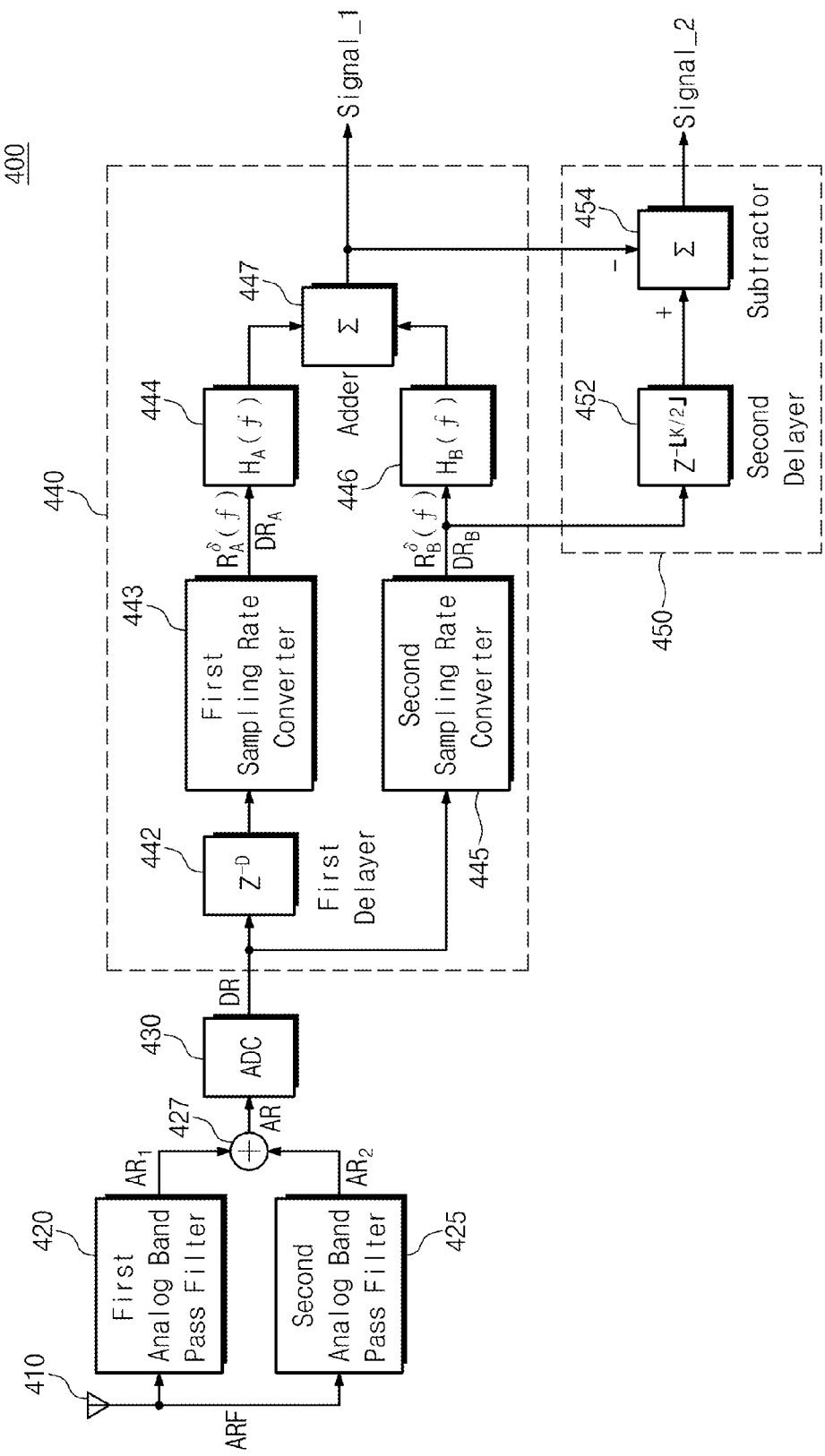
FIG. 11 is a schematic block diagram illustrating a double-band receiver according to a fourth embodiment of the present invention.

FIG. 11 is a schematic block diagram illustrating a multi-band receiver 400 according to a fourth embodiment of the present invention. Referring to FIG. 11, the multi-band receiver 400 of the present invention may include an antenna 410, first and second analog band pass filters 420 and 425, an adder 427, an ADC 430, a first signal extracting unit 440 and a second signal extracting unit 450. Here, the antenna 410, the first and second analog band pass filters 420 and 425, the adder 427, the ADC 430 and the first signal extracting unit 440 are substantially the same as those of FIG. 8. Therefore, detailed descriptions of the foregoing elements are omitted.

A first signal signal__1 may be generated by an adder 447 that adds outputs of first and second digital filters 444 and 446. A second signal signal__2 may be extracted by subtracting the first signal signal__1 that is an output of the adder 447 from an output of the ADC 430. Here, it is assumed that the first and second digital filters 444 and 446 are provided as FIR filters having a tap length of K. Then, the first signal signal__1 that is the output of the adder 447 undergoes a sample delay of round(K/2) compared to an output of a second sampling rate converter 445 which does not pass through a digital filter. Therefore, if the output of the second sampling rate converter 445 is sample-delayed by as much as round(K/2) using a second layer 452, it may be synchronized with the first signal signal__1 in a subtractor 454. When the first signal signal__1 is subtracted from the output of the second sampling rate converter 445, which has been delayed by as much as round (K/2), by the subtractor 454, the second signal signal__2 is extracted.

According to the present invention, multi-band signals at arbitrary frequency bands may be simultaneously down-converted to be received, while using a single RF chain and a single ADC.

According to the present invention, interference between two signals at a baseband may be cancelled to separate a desired signal using a single ADC.

Furthermore, since a single ADC is used, the complexity and size of hardware and the cost for manufacturing the same are reduced compared to a typical technology for which two ADCs are used.

Moreover, the present invention may resolve the performance degradation caused by a delay time error and signal magnitude irregularity between two paths which occur when using a second order band pass sampling technique for which two ADCs are used.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multi-band receiver comprising:
    an analog-to-digital converter configured to convert multi-band analog radio signals into a digital baseband signal; and
    a first signal extracting unit configured to generate a first path signal by changing a sampling rate of the digital baseband signal and sample-delaying the digital baseband signal, and generate a second path signal by bypassing the digital baseband signal, wherein
    the first signal extracting unit includes a first adder having the first and the second path signals as inputs and extracting a first baseband signal at an output, using a first group delay difference between the first and second path signals caused by a first sample delay difference between the first and second path signals.

2. The multi-band signal of claim 1, wherein the first signal extracting unit comprises:
    a first sampling rate converter configured to change the sampling rate of the digital baseband signal;
    a sample delayer configured to delay an output of the first sampling rate converter by at least one sample unit to produce the sample-delayed digital baseband signal;
    a second sampling rate converter configured to change a sampling rate of the sample-delayed digital baseband signal to output the first path signal;
    a first digital filter configured to filter the first path signal;
    a second digital filter configured to filter the second path signal; and
    the first adder configured to add a result of filtering of the first digital filter and a result of filtering of the second digital filter to output the first baseband signal.

3. The multi-band receiver of claim 2, wherein the second digital filter comprises a multiplier for amplifying the digital baseband signal with a specific gain.

4. The multi-band receiver of claim 3, further comprising a synchronous delayer for delaying the digital baseband signal by a specific delay time to provide a delayed digital baseband signal to the multiplier.

5. The multi-band receiver of claim 2, wherein the first adder comprises a subtractor for subtracting the result of filtering of the second digital filter from the result of filtering of the first digital filter to output the first baseband signal.

6. The multi-band receiver of claim 1, further comprising:
a second signal extracting unit configured to provide the first path signal as a third path signal and provide a fourth path signal by bypassing the digital baseband signal, wherein
the second signal extracting unit extracts a second baseband signal using a second group delay difference between the third and fourth path signals caused by a second sample delay difference between the third and fourth path signals.

7. The multi-band signal of claim 6, wherein the second signal extracting unit comprises:
a third digital filter configured to filter the third path signal;
a fourth digital filter configured to filter the fourth path signal; and
a second adder configured to add a result of filtering of the third digital filter and a result of filtering of the fourth digital filter to output the second baseband signal.

8. The multi-band receiver of claim 7, wherein the fourth digital filter comprises a multiplier for amplifying the digital baseband signal with a specific gain.

9. The multi-band receiver of claim 8, further comprising a synchronous delayer for delaying the digital baseband signal by a specific delay time to provide a delayed digital baseband signal to the multiplier.

10. The multi-band receiver of claim 7, wherein the second adder comprises a subtractor for subtracting the result of filtering of the fourth digital filter from the result of filtering of the third digital filter to output the second baseband signal.

11. The multi-band receiver of claim 2, further comprising a second signal extracting unit for subtracting a signal obtained by delaying the second path signal by a specific length from the first baseband signal to output a second baseband signal.

12. The multi-band receiver of claim 11, wherein the second signal extracting unit comprises:
a second sample delayer configured to delay the second path signal by the specific length; and
a subtractor configured to subtract an output of the second sample delayer from the first baseband signal.

13. A multi-band receiver comprising:
an analog-to-digital converter configured to convert multi-band analog radio signals into a digital baseband signal; and
a first signal extracting unit configured to generate a first path signal by sample-delaying the digital baseband signal and changing a sampling rate thereof, and generate a second path signal by changing the sampling rate of the digital baseband signal, wherein
the first signal extracting unit includes a first adder having the first and the second path signals as inputs and extracting a first baseband signal at an output, using a first group delay difference between the first and the second path signals caused by a first sample delay difference between the first and the second path signals.

14. The multi-band signal of claim 13, wherein the first signal extracting unit comprises:
a sample delayer configured to delay the digital baseband signal by at least one sample unit;
a first sampling rate converter configured to change a sampling rate of an output signal of the sample delayer to output the first path signal;
a second sampling rate converter configured to change the sampling rate of the digital baseband signal to output the second path signal;
a first digital filter configured to filter the first path signal;
a second digital filter configured to filter the second path signal; and
the first adder configured to add a result of filtering of the first digital filter and a result of filtering of the second digital filter to output the first baseband signal.

15. The multi-band receiver of claim 14, wherein the second digital filter comprises a multiplier for amplifying the digital baseband signal with a specific gain.

16. The multi-band receiver of claim 13, further comprising:
a second signal extracting unit configured to provide the first path signal as a third path signal and provide the second path signal as a fourth path signal, wherein
the second signal extracting unit extracts a second baseband signal using a second group delay difference between the third and fourth path signals caused by a second sample delay difference between the third and fourth path signals.

17. The multi-band signal of claim 16, wherein the second signal extracting unit comprises:
a third digital filter configured to filter the third path signal;
a fourth digital filter configured to filter the fourth path signal; and
an adder configured to add a result of filtering of the third digital filter and a result of filtering of the fourth digital filter to output the second baseband signal.

18. The multi-band receiver of claim 17, wherein the fourth digital filter comprises a multiplier for amplifying the digital baseband signal with a specific gain.

19. The multi-band receiver of claim 13, further comprising a second signal extracting unit for subtracting a signal obtained by delaying the second path signal by a specific length from the first baseband signal to output a second baseband signal.

20. The multi-band receiver of claim 19, wherein the second signal extracting unit comprises:
a second sample delayer configured to delay the second path signal by the specific length; and
a subtractor configured to subtract an output of the second sample delayer from the first baseband signal.

* * * * *